(12) United States Patent
Clark et al.

(10) Patent No.: US 10,043,024 B2
(45) Date of Patent: *Aug. 7, 2018

(54) INTELLIGENT GOVERNANCE CONTROLS BASED ON REAL-TIME CONTEXTS

(71) Applicant: International Business Machines Corporation, Armonk, NY (US)

(72) Inventors: Adam T. Clark, Mantorville, MN (US); John S. Mysak, Rochester, MN (US); Aspen L. Payton, Byron, MN (US); John E. Petri, St. Charles, MN (US); Michael D. Pfeifer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 550 days.

This patent is subject to a terminal disclaimer.

(21) Appl. No.: 14/722,521

(22) Filed: May 27, 2015

(65) Prior Publication Data

US 2016/0232245 A1 Aug. 11, 2016

Related U.S. Application Data

(63) Continuation of application No. 14/618,094, filed on Feb. 10, 2015, now Pat. No. 9,886,591.

(51) Int. Cl.
 *G06F 17/30* (2006.01)
 *G06F 21/62* (2013.01)
 (Continued)

(52) U.S. Cl.
 CPC .... *G06F 21/6218* (2013.01); *G06F 17/30663* (2013.01); *G06F 17/30734* (2013.01);
 (Continued)

(58) Field of Classification Search
 CPC ... G09B 7/02; G09B 7/00; G09B 5/08; G09B 7/04; G06F 17/241; G06F 17/30867;
 (Continued)

(56) References Cited

U.S. PATENT DOCUMENTS

| 6,988,138 B1 | 1/2006 | Alcorn et al. |
| 7,110,989 B2 | 9/2006 | Osamu Lemoto |

(Continued)

FOREIGN PATENT DOCUMENTS

EP 2202647 A1 6/2010

OTHER PUBLICATIONS

Casper, "Casper Focus User Guide, Version 9.3", JAMF Software, pp. 1-15.

(Continued)

*Primary Examiner* — Dangelino N Gortayo
(74) *Attorney, Agent, or Firm* — Patterson + Sheridan, LLP

(57) ABSTRACT

Method to perform an operation comprising receiving, from a set of input devices, data of an environment surrounding a computing device, determining a current context of a discussion based on the data and a timing schedule specifying a list of planned contexts, receiving a request to perform an operation on the computing device, determining a context of the requested operation, determining a measure of relatedness between the contexts, and upon determining the measure of relatedness does not exceed a predefined threshold, restricting execution of the operation.

8 Claims, 4 Drawing Sheets

Figure 1:
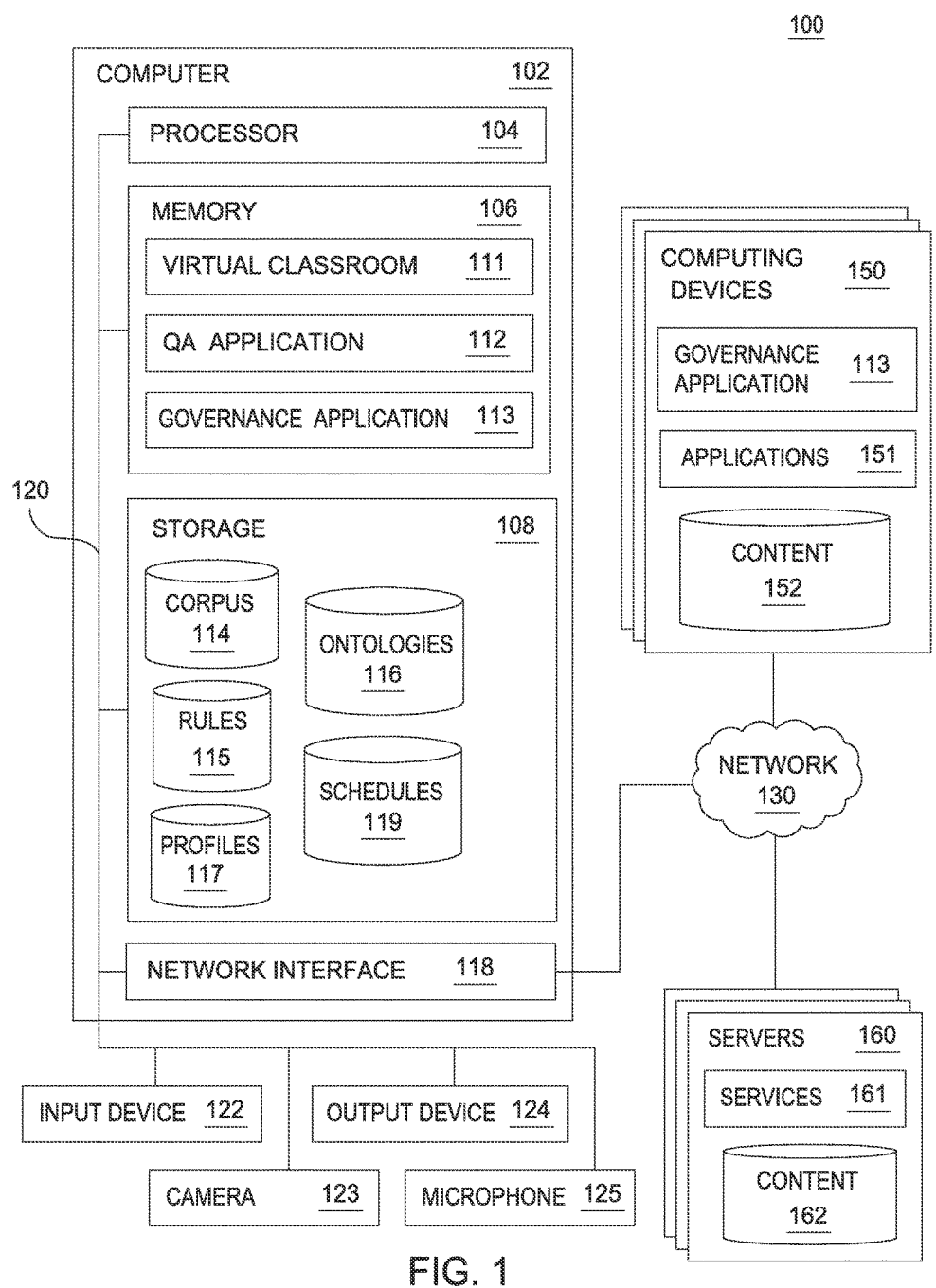

(51) Int. Cl.
*G09B 7/00* (2006.01)
*G09B 7/02* (2006.01)

(52) U.S. Cl.
CPC .. *G06F 17/30867* (2013.01); *G06F 17/30017* (2013.01); *G06F 17/30873* (2013.01); *G06F 17/30997* (2013.01); *G06F 2221/2149* (2013.01); *G09B 7/00* (2013.01); *G09B 7/02* (2013.01)

(58) Field of Classification Search
CPC ......... G06F 17/30873; G06F 17/30017; G06F 17/30321; G06F 17/30997
USPC ........ 707/785, 912, 942; 434/236, 350, 322, 434/326, 362, 365, 434
See application file for complete search history.

(56) References Cited

U.S. PATENT DOCUMENTS

| | | |
|---|---|---|
| 7,392,185 B2 | 6/2008 | Bennett |
| 7,783,668 B2 | 8/2010 | Vogel et al. |
| 7,908,602 B2 | 3/2011 | Alcorn et al. |
| 8,516,533 B2 | 8/2013 | Davis et al. |
| 8,571,538 B2 | 10/2013 | Sprigg et al. |
| 8,602,793 B1 * | 12/2013 | Sniedzins ................. G09B 5/00 434/322 |
| 8,628,331 B1 * | 1/2014 | Wright ................... G09B 19/00 434/107 |
| 8,713,016 B2 | 4/2014 | Chipman et al. |
| 8,761,658 B2 | 6/2014 | Kim et al. |
| 8,825,858 B1 | 9/2014 | Atchity et al. |
| 8,914,735 B2 * | 12/2014 | Sitrick ................... G06Q 10/10 715/751 |
| 8,918,722 B2 | 12/2014 | Sitrick et al. |
| 9,235,693 B2 | 1/2016 | Kasterstein et al. |
| 9,280,559 B1 | 3/2016 | Jones |
| 9,330,366 B2 * | 5/2016 | Sitrick ............... G06Q 10/0631 |
| 9,413,784 B2 | 8/2016 | Kohno et al. |
| 2003/0233419 A1 | 12/2003 | Beringer |
| 2008/0005138 A1 | 1/2008 | Gauthier et al. |
| 2008/0222183 A1 | 9/2008 | Petri |
| 2009/0215018 A1 | 8/2009 | Edmondson et al. |
| 2010/0316987 A1 * | 12/2010 | Charlson ................. G09B 5/00 434/362 |
| 2011/0301996 A1 | 12/2011 | Johnson et al. |
| 2011/0302004 A1 | 12/2011 | Johnson et al. |
| 2012/0231434 A1 | 9/2012 | Standage |
| 2012/0231441 A1 | 9/2012 | Parthasarathy et al. |
| 2012/0278738 A1 | 11/2012 | Kruse et al. |
| 2013/0017522 A1 | 1/2013 | Nguyen et al. |
| 2013/0044128 A1 | 2/2013 | Liu et al. |
| 2013/0089849 A1 | 4/2013 | Huang |
| 2013/0149687 A1 | 6/2013 | Argott |
| 2013/0262365 A1 | 10/2013 | Dolbear et al. |
| 2013/0344859 A1 | 12/2013 | Abramson et al. |
| 2014/0004496 A1 | 1/2014 | Reddy et al. |
| 2014/0018048 A1 | 1/2014 | Anand et al. |
| 2014/0147823 A1 | 5/2014 | Wolfe |
| 2014/0207950 A1 | 7/2014 | Badlee et al. |
| 2014/0282606 A1 | 9/2014 | Clark et al. |
| 2014/0337223 A1 | 11/2014 | Kapoor |
| 2015/0079577 A1 | 3/2015 | Teitelbaum |
| 2015/0104778 A1 * | 4/2015 | Liu ........................... G09B 7/04 434/335 |
| 2015/0235131 A1 | 8/2015 | Allen et al. |
| 2015/0235132 A1 | 8/2015 | Allen et al. |
| 2015/0304330 A1 | 10/2015 | Soamboonsrup et al. |
| 2015/0304484 A1 | 10/2015 | Halmstad et al. |
| 2016/0037333 A1 | 2/2016 | Amundsen et al. |
| 2016/0234223 A1 | 8/2016 | Clark et al. |
| 2016/0253912 A1 * | 9/2016 | Heilman .................. G09B 5/08 434/309 |

OTHER PUBLICATIONS

LanSchool, "LanSchool User Guide", Apr. 25, 2014, pp. 1-38.
Torniai et al., "M-Loco: An Ontology-Based Framework for Context-Aware Mobile Learning", Research Gate, Jan. 2008, pp. 1-10.
Ogata, et al., "Context-Aware Support for Computer-Supported Ubiquitous Learning", 2004, Proceedings of the 2nd IEEE International Workshop on Wireless and Mobile Technologies in Education (WMTE '04), pp. 1-9.
Berri, "Ontology-Based Framework for Context-Aware Mobile Learning", Jul. 6, 2006, pp. 1307-1310.
Adams, "Wireless Laptops in the Classroom (and the Sesame Street Syndrome)," Communications of the ACM, Sep. 2006. vol. 49, No. 9, pp. 25-27. © 2006 ACM 0001-0782/06/0900.
Apple, "Teacher's Assistant Pro: Track Student Behavior", Lesson Portal, LLC, https://itunes.apple.com/us/app/teachers-assistant-pro-track/id391643755?mt=8 Copyright © 2014 Apple Inc.
Brubaker, "Faculty Perceptions of the Impact of Student Laptop Use in a Wireless Internet Environment on the Classroom Learning Environment and Teaching," Master's Paper for the M.S. in I.S. degree, Nov. 2006. Chapel Hill, NC, 104 pages.
Clark et al, "Resource Management in a Presentation Environment", U.S. Appl. No. 14/618,059, filed Feb. 10, 2015.
Fang, "From Distraction to Engagement: Wireless Devices in the Classroom," EDUCAUSEreview online, published Dec. 22, 2009. http://www.educause.edu/ero/article/distraction-engagement-wireless-devices-classroom Last accessed Nov. 19, 2014, 6:59 PM, 12 pages.
Lai, "Chart: Top 100 iPad Rollouts by Enterprises & Schools," Forbes Brand Voice, Updated Oct. 16, 2012, http://www.forbes.com/sites/sap/2012/08/31/top-50-ipad-rollouts-by-enterprises-schools/ Last accessed May 27, 2015, 11:00AM.
McCabe et al. "Teaching with CAA in an Interactive Classroom," Jun. 10, 2003, Department of Mathematics, University of Portsmouth, 12 pages.
Netop, "Classroom Management Solutions: iPads in School," Netop Classroom Managment, http://www.netop.com/classroom-management-software/results/ipads-in-schools.htm Last accessed May 27, 2015, 11:00AM.
Stolle, "Rochester school district seeks iPad for each student," The Post-Bulletin, Posted Jun. 19, 2012, 9:01AM, http://www.postbulletin.com/news/local/rochester-school-district-seeks-ipad-for-each-student/article_e1f0acdc-81ba-55b7-b527-b14f41237220.html.
Unknown, "A better classroom for students, teachers, and IT administrators," Casper Focus, http://www.jamfsoftware.com/products/casper-focus/ Copyright © JAMF Software, LLC 2002-2015.
Unknown, "Cecily uses ClassDojo to build positive behavior with her students," https://www.classdojo.com/ Last accessed: Feb. 2, 2015 11:55 AM.
Unknown, "Visualizing student understanding has never been clearer", MasteryConnect, http://www.socrative.com/ © 2014 Socrative.com, Last accessed:Dec. 18, 2013 11:57 AM.
Wang, "Context Awareness and Adaptation in Mobile Learning," Proceedings of the 2nd IEEE International Workshop on Wireless and Mobile Technologies in Education (WMTE'04), IEEE Computer Society, 0-7695-1989-X/04, 2004, pp. 154-158.
Clark et al, "Intelligent Governance Controls Based on Real-Time Contexts", U.S. Appl. No. 14/618,094, filed Feb. 10, 2015.
IBM "List of IBM Patents or Patent Applications Treated as Related".

* cited by examiner

INTELLIGENT GOVERNANCE CONTROLS BASED ON REAL-TIME CONTEXTS

CROSS-REFERENCE TO RELATED APPLICATIONS

This application is a continuation of co-pending U.S. patent application Ser. No. 14/618,094, filed Feb. 10, 2015. The aforementioned related patent application is herein incorporated by reference in its entirety.

BACKGROUND

The present invention relates to governance controls on computing devices, and more specifically, to intelligent governance controls based on real-time contexts.

Educational institutions are increasingly embracing students' use of computers both in and out of the classroom, especially the use of tablets and other small-form computing platforms. Moreover, instead of relying exclusively on a controlled set of instructional materials and applications, educators are increasingly utilizing online sources of information. However, one problem with students having access to a computer in the classroom is the opportunity for distraction via games, Internet browsing, social media, and other potential distractions. Many classroom management applications are available to filter web sites, restrict access to a limited set of apps, and the like. However, these tools are typically employed statically, and do not adjust as the learning environment changes.

SUMMARY

Embodiments disclosed herein provide systems, methods, and computer program products to perform an operation comprising receiving, from a set of input devices, data of an environment surrounding a computing device, determining a current context of a discussion based on the data and a timing schedule specifying a list of planned contexts, receiving a request to perform an operation on the computing device, determining a context of the requested operation, determining a measure of relatedness between the contexts, and upon determining the measure of relatedness does not exceed a predefined threshold, restricting execution of the operation.

BRIEF DESCRIPTION OF THE SEVERAL VIEWS OF THE DRAWINGS

FIG. 1 illustrates a system which provides intelligent governance controls based on real-time contexts, according to one embodiment.

FIG. 2 illustrates a method to provide intelligent governance controls based on real-time contexts, according to one embodiment.

FIG. 3 illustrates a method to determine a current context, according to one embodiment.

FIG. 4 illustrates a method to determine whether a requested operation is permitted, according to one embodiment.

DETAILED DESCRIPTION

Embodiments disclosed herein provide techniques for governing network or application access on computing platforms based on an external context. For example, in a classroom setting, a governance application may permit students to access a calculator or other mathematics application on a tablet computer during a math lesson. At the same time, the governance application may restrict access to map or geography applications during the math lesson. However, if the instructor begins discussing a geography related topic (e.g., in the context of the math lesson), students' access to the calculator and math applications remains, but additional access map and geography related applications may be allowed. In addition, the governance system may determine whether to grant access to content (e.g., a web page) by evaluating the text of that web page relative to the current context of the lesson.

Generally, embodiments disclosed herein determine a current context in an environment (such as a classroom, lecture hall, test-taking center, conference room, meeting room, and the like). For example, embodiments disclosed herein may use cameras to capture images of a whiteboard in a classroom, and analyze the image data to identify text on a whiteboard to identify an underlying set of subjects, topics, or concepts being discussed. In addition (or alternatively), embodiments disclosed herein may use microphones to capture an audio recording of a classroom. The recorded audio may be processed using voice recognition tools to provide a stream of unstructured text analyzed to identify concepts, topics, or subjects. Further still, embodiments disclosed herein may analyze messages exchanged among teachers and students in a virtual classroom to determine a current topic.

For example, if an instructor writes several mathematical equations on the whiteboard and is discussing the Pythagorean Theorem, the governance system may determine that the current subject (or context) is mathematics. As such, the governance system may restrict the students' computing devices to those applications that are relevant to a lecture in mathematics. Additionally, the governance system may restrict access to remote services and content that are not relevant or related to mathematics, while allowing access to math-related content and services. Further, the governance system may restrict search engine queries submitted by the students where the queries do not include math-related concepts while allowing queries related to math. Further still, when search engine queries are permitted, embodiments disclosed herein may restrict access to results returned by the search engine to only those results that are related to math.

More generally, the governance system may allow (or deny) access to any computing service or resource, whether local or remote by comparing the content of the resource to a current context of the educational classroom. However, while an instructional setting, with a classroom of students and instructors, is used as a reference example, this example should not be considered limiting of the disclosure. Instead, embodiments disclosed herein may readily be adapted for a variety of other contexts, including, e.g., testing environments, business environments, and the like. Further, embodiments presented herein may readily be adapted to virtual or online environments, such as such as virtual classrooms or virtual worlds, etc.

FIG. 1 illustrates a system 100 which provides intelligent governance controls based on real-time contexts, according to one embodiment. The system 100 includes a computer 102 connected to other computers via a network 130. In general, the network 130 may be a telecommunications network and/or a wide area network (WAN). In a particular embodiment, the network 130 includes access to the Internet.

The computer 102 generally includes a processor 104 which obtains instructions and data via a bus 120 from a memory 106 and/or storage 108. The computer 102 may also include one or more network interface devices 118, input devices 122, cameras 123, output devices 124, and microphone 125 connected to the bus 120. The computer 102 is generally under the control of an operating system. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. The camera 123 may be any image capture device configured to provide image data to the computer 102. The output device 124 may include monitors, touch screen displays, and so on. The microphone 125 is configured to capture and record audio data.

As shown, the memory 106 contains a virtual classroom application 111. The virtual classroom 111 is any application configured to provide a virtual learning environment, such as a chat room or any dedicated suite of online learning tools. The memory 106 also contains a QA application 112, which is an application generally configured to provide a deep question answering (QA) system. One example of a deep question answering system is Watson, by the IBM Corporation of Armonk, N.Y. A user may submit a case (also referred to as a question) to the QA application 112. The QA application 112 provides an answer to the case based on an analysis of a corpus of information 114. Although depicted as executing on a single computer, the QA application 112 may run on a grid or cluster of computers.

The QA application 112 is trained to generate responses to cases during a training phase. During the training phase, the QA application 112 is trained to answer cases using an "answer key" which predefines the most correct responses. During training, the QA application 112 ingests content in the corpus 114 to produce one or more machine learning models (not pictured). In addition, during the training phase, the QA application 112 is configured to identify data attributes which are important to answering cases (namely, those attributes having an impact on the confidence score of a given answer).

After being trained, the QA application 112 may process user cases through a runtime analysis pipeline. In at least one embodiment, the schedules 119 include lesson plans for a given course, and the candidate answers returned by the QA application 112 correspond to a set of identified topics, ranked by a confidence score of each respective candidate answer—with the confidence score being an indication of how central each candidate answer is to the core content for each lesson in its proper context. The analysis pipeline executes a collection of analysis programs to evaluate both the question text and candidate answers (i.e., text passages extracted from documents in a corpus 114) in order to construct the most probable correct answer, based on the information extracted from the corpus and from the question. A typical execution pipeline may begin with question analysis, which analyzes and annotates each question presented in the case to identify key topics, concepts, and attributes for conducting a search. The next step of the pipeline may include a primary search, which involves searching for documents in the corpus 114 using the key attributes from the question analysis phase. The next step of the pipeline may generate candidate answers. For example, the QA application 112 may identify key matching passages (based on, for example, topics, concepts, and/or string matching) from the search results with passages in the candidate answers. In the next step of the pipeline, the QA application 112 may then retrieve and process supporting evidence for the candidate answers. The QA application 112 may then complete the pipeline by scoring the various candidate answers, from which the most correct answer identified by the QA application 112 may returned to the user along with any retrieved and processed items of supporting evidence.

As shown, the memory 106 includes a governance application 113 configured to control access on the computing devices 150 to any local or remote computing resource, including, without limitation, files, content, applications, features on the computing devices 150 (such as enabling Bluetooth® Advanced Audio Distribution Profile (A2DP) for music streaming), services (such as Internet access), components within an application, and the like. The governance application 113 controls access to the particular computing resources which are available in a given environment based on a current context of that environment. In one embodiment, the governance application 112 interfaces with the QA application 112 to determine the current context in the environment. While shown as distinct applications, the functionality of the governance application 113 and the QA application 112 may be integrated into a single application. In one embodiment, the QA application 112 determines the context by analyzing sources of input data available in the current environment. For example, the QA application 112 may convert speech captured by the microphone 125 to text, and analyze the text to identify one or more concepts being discussed by the instructor. In addition, the QA application 112 may identify silence in a classroom and determine that students are taking an exam, or participating in a quiet study session. Similarly, the QA application 112 may analyze text in a virtual classroom to identify concepts being discussed by an instructor. Further still, the QA application 112 may identify text in an image of a classroom blackboard captured by the camera 125, and analyze the text to determine one or more concepts in the text.

For example, if a teacher in the virtual classroom 111 is sending messages about the American Revolution via web chat, the QA application 112 may identify keywords about the concept such as "1776," "declaration of independence," and the like. The QA application 112 may then reference an ontology 116 to determine that the American Revolution is a current topic (or concept) of the lecture. The QA application 112 may inform the governance application 113 of the current topic, such that the governance application 113 may enforce rules in the rules 115 to control access to different computing resources. For example, if a student using a computing device 150 to access the web chat about the American Revolution attempts to search for the keywords "George Washington" in a search engine service provided by the services 161, the QA application 112 may return an indication that "George Washington" is sufficiently related to the American Revolution (for example, by referencing the ontology 116), and the governance application 113 may permit the search to proceed. Similarly, if the student attempts to access a search result point to a biography of George Washington in the content 162, the QA application 112 may again determine that the concepts are related, and the governance application 113 may permit the biography page to be loaded on the student's computing device 150. In at least one embodiment, the governance application 113 may store an indication that George Washington is related to the current lecture topic, and need not reference the QA application 112 to determine that the biography page can be accessed.

While the instructor continues to discuss the American Revolution, the student may attempt to use the search engine to search for "organic chemistry structures." The governance application 113 may provide the search query to the QA application 112, which may return an indication that the query is not sufficiently related to the American Revolution. The governance application 113 may then restrict the search query from being submitted by the student's computing device 150. Similarly, if the student attempts to open their favorite video game application 151 on the computing device 150, the governance application 113 may reference a rule in the rules 115 to determine that video game application is restricted during all types of lectures. As such, the governance application 113 may restrict the computing device 150 from opening the video game application 151. If a specific rule 115 does not address the video game application 151, the governance application 113 may again interface with the QA application 112 to determine whether the video game is related to the current lecture topic. The QA application 112, may, for example, search the Internet or the corpus 114 for metadata describing the video game. If the QA application 112 determines that the video game is purely for leisure, the QA application 112 may return an indication, and the governance application 113 may block the video game accordingly. However, if the QA application 112 determines the video game is related to the American Revolution, the QA application 112 may return a corresponding indication, and the governance application 113 may permit execution of the video game application 151 on the student's computing device 150.

In at least one embodiment, the QA application 112 may compute a measure of relatedness between the requested operation and the current context. If the computed measure of similarity exceeds a threshold level of similarity, the QA application 112 may determine that the requested operation is related to the current context, and permit execution of the requested operation. If, however, the measure of similarity does not exceed the similarity threshold, the QA application 112 may determine that the requested operation is not related to the current context, and restrict execution (or performance) of the operation.

As shown, the storage 108 includes a corpus 114, rules 115, ontologies 116, profiles 117, and schedules 119. The corpus 114 is a body of information used by the QA application 112 to generate answers to questions (also referred to as cases). For example, the corpus 114 may contain scholarly articles, dictionary definitions, encyclopedia references, product descriptions, web pages, and the like. The rules 115 may include rules defining access permissions to different computing functions, resources, applications, documents, services, search engines, and the like. The access permissions may be related to a concept. For example, a first rule in the rules 115 may permit access to an e-reader application executing on a computing device 150 while an instructor is discussing a novel in a classroom. In addition, a second rule may restrict the e-reader application to displaying only the novel being discussed (or similar content), and not unrelated content. Therefore, the rules 115 may include rules explicitly permitting or restricting specific items, such as the applications 151, documents 152, services 161, and content 162. In addition, however, the rules 115 may include more general rules that apply to broader contexts. For example, if the instructor is discussing a novel, a student may attempt to open any type of reading material on their e-reader computing device 150. Therefore, the rules 115 may specify rules to assist the QA application 112 to determine whether an e-book is related to the current novel being discussed by the instructor. More generally, the rules 115 may include rules that assist the QA application 112 to determine whether a requested operation is related to the current context in the relevant environment. For example, the rules 115 may specify a maximum distance between two concepts in an ontology 116 that allow the QA application 112 to determine that the concepts are related. In at least one embodiment, the rules stored in the rules 115 may be global rules, applying to all users, as well as more specific rules tailored to subsets of users (or individual users).

The ontologies 116 include one or more ontologies providing a structural framework for organizing information. An ontology formally represents knowledge as a set of concepts within a domain, and the relationships between those concepts. Profiles 117 include information related to different users. The user profiles in the profiles 117 may include any information about the users, including biographical information, education level, profession, and the like. The schedules 119 may include data specifying lesson plans, lecture topics, business agendas, and the like. For example, a teacher may create a day's lesson plan that specifies which topics will be taught at which times during the day (such as Greek mythology being taught from 9:00-10:00 AM). In at least one embodiment, the governance application 113 and/or the QA application 112 may leverage the schedules 119 when determining the current context (or topic of discussion).

As shown, the networked system 100 a plurality of computing devices 150. The computing devices 150 may be any type of computing device, including, without limitation, laptop computers, desktop computers, tablet computers, smartphones, portable media players, portable gaming devices, and the like. As shown, the computing devices 150 include an instance of the governance application 113 to provide access controls to applications 151 and content 152 on the computing devices 151 (and other features on the computing devices 150), as well as services 161 and content 162 on the remote servers 160. In one embodiment, the governance application 113 is a plug-in that other applications 151 may invoke. In another embodiment, the governance application 113 is an operating system level service.

The instance of the governance application 151 may interface with the instance of the governance application 113 on the computer 102. For example, when a user of the computing device 150 requests to perform an operation (such as opening an application 151 or accessing an item of content 152), the instance of the governance application 113 on the computing device 150 may send an indication of the requested operation to the instance of the governance application 113 executing on the computer 102. The instance of the governance application 113 executing on the computer 102 may process the request and return an indication that the requested operation should be allowed or denied. Upon receiving the indication, the instance of the governance application 113 executing on the computing device 150 may allow or deny the request accordingly. The applications 151 may include any application or service, such as word processors, web browsers, e-reading applications, video games, productivity software, business software, educational software, and the like. The content 152 may be any locally stored content, such as documents, media files, and the like. As previously indicated, the governance application 113 may restrict or permit access to the applications 151 and content 152 by the computing devices 150.

As shown, remote servers 160 provide services 161 and content 162 to the computing devices 150. The services 161 may include any computing service, such as search engines, online applications, and the like. The content 162 may be any content, such as web pages (e.g., an online encyclopedia), media, and the like. As indicated, the governance application 113 may restrict access to the services 161 and content 162 by the computing devices 150.

Figure 2:
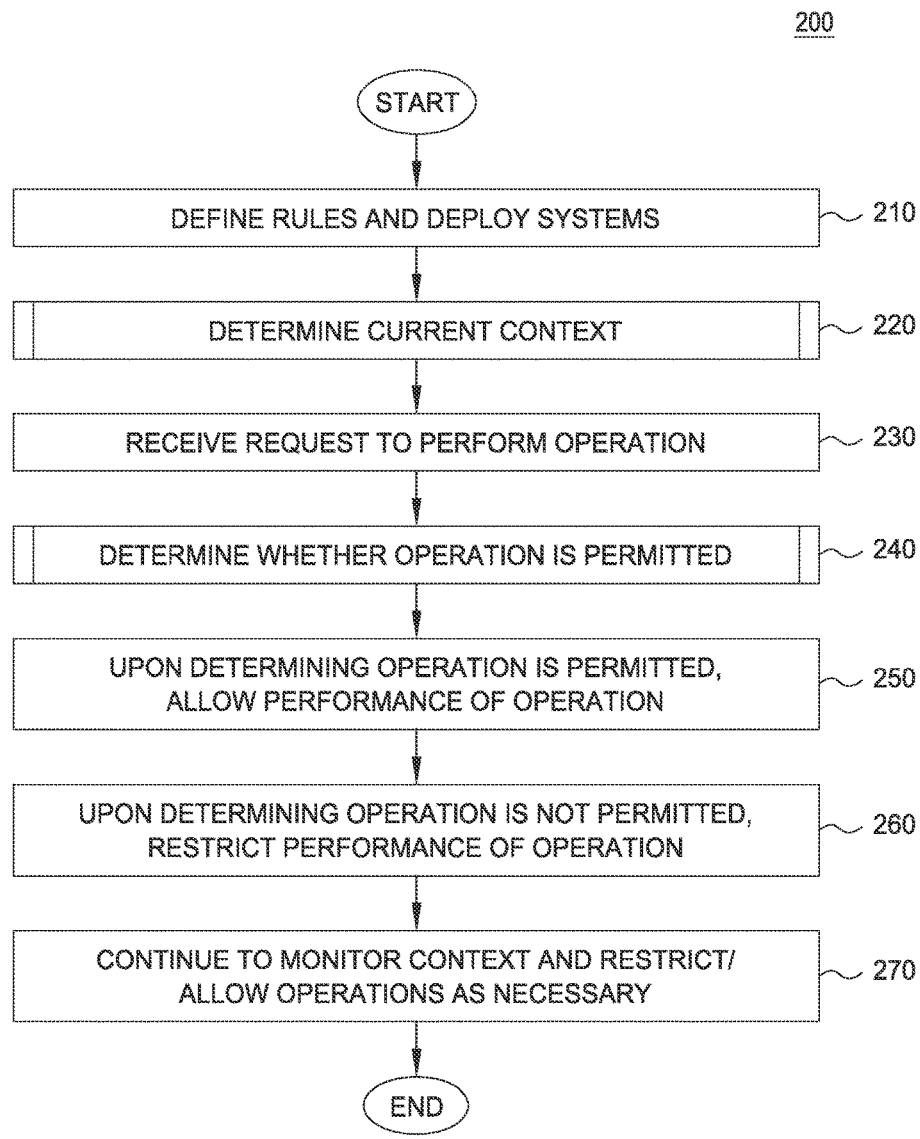

FIG. 2 illustrates a method 200 to provide intelligent governance controls based on real-time contexts, according to one embodiment. Generally, the steps of the method 200 allow the governance application 113 to dynamically restrict access to content and/or applications based on a current context (or topic) identified by the QA application 112. The method begins at step 210, where an administrator may define rules 115 (in addition to existing rules). In one embodiment, the administrator may define rules 115 specifying what computing resources are available during a given context. For example, the administrator may define a rule allowing students to access a word processing application during a creative writing session, while defining another rule that restricts other applications. More generally, at step 210, the administrator may configure and deploy the governance application 113 and/or the QA application 112.

At step 220, the QA application 112 may determine a current context in the relevant environment. As noted, the current context may be defined by a rule 115 providing a schedule. However, the QA application 112 may evaluate audio and/or video and textual data to determine the current context. For example, the QA application 112 may analyze captured audio and determine a professor is discussing wild animals. The QA application 112 may also analyze captured image data and determine that the professor has projected images of lions and tigers on a projection screen in the lecture hall. Based on these sensory inputs, the QA application 112 may identify related concepts, topics, or subjects such as "animals," "wild animals," "zoology," "biology," and the like.

At step 230, the governance application 113 may receive an indication of a user request to perform an operation on a computing device 150. For example, the user may attempt to access an image of a Burmese python stored on the computing device, or execute a search engine query on "animals of Africa." At step 240, described in greater detail with reference to FIG. 3, the governance application 113 and/or the QA application 112 may determine whether the requested operation is permitted. Generally, the governance application 113 and/or the QA application 112 may determine whether the operation is permitted based on the rules 115 and/or whether the requested operation is relevant to the current context.

At step 250, the governance application 113 may allow performance (or execution) of the requested operation upon determining that the requested operation is permitted. At step 260, the governance application 113 may restrict performance (or execution) of the operation upon determining that the requested operation is prohibited. At step 270, the QA application 112 may continue to monitor the current context to enable the governance application 113 to restrict and/or allow requested operations as necessary. For example, if the professor stops discussing wild animals, removes the images of the animals, and begins writing algebraic equations on the blackboard, the QA application 112 may determine that the context has changed, and that math is the current subject. Therefore, the governance application 113 may apply a new set of rules corresponding to the current context and restrict and/or allow operations to be performed on the computing devices 150 as appropriate.

Figure 3:
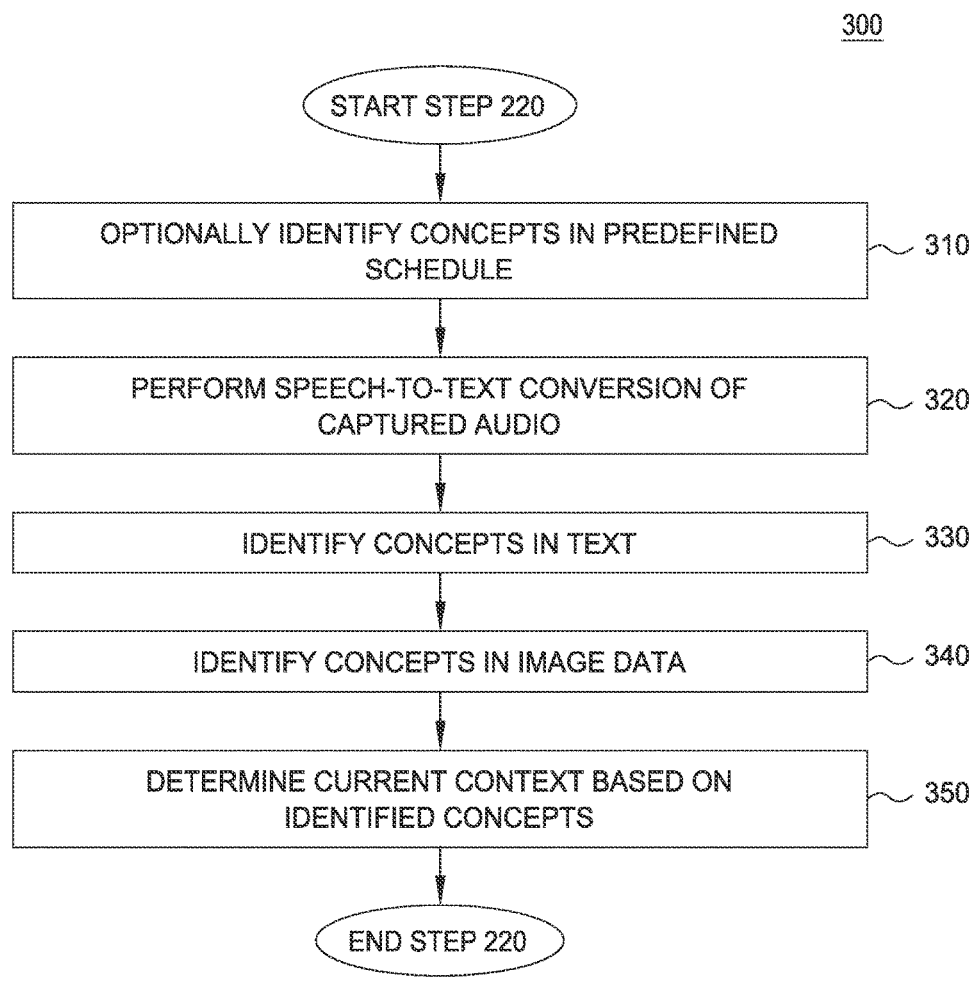

FIG. 3 illustrates a method 300 corresponding to step 230, according to one embodiment. That is, FIG. 3 illustrates a method 300 to determine a current context, according to one embodiment. In at least one embodiment, the QA application 112 performs the steps of the method 300. The method 300 begins at step 310, where the QA application 112 may optionally identify concepts specified in a predefined schedule of concepts in the schedules 119. For example, a teacher may specify daily schedules indicating which subjects will be taught at what times. The QA application 112 may use these schedules to supplement natural language processing performed on any captured text, speech, images, and the like. At step 320, the QA application 112 may convert speech captured by the microphone 125 to text. At step 330, the QA application 112 may identify concepts in text. The text may be the output of the converted speech at step 320, or may be text captured by the QA application 112 from different sources, such as the virtual classroom application 111. At step 340, the QA application 112 may identify concepts in image data. The image data may include images and/or text that the QA application 112 may analyze to identify concepts. At step 350, the QA application 112 may determine the current context based on the concepts identified at step 310-340. Therefore, for example, if the QA application 112 determines that a lesson plan in the schedules 119 indicates a geometry lesson is scheduled for 2:00-3:00 PM, that the instructor is talking about the angles of a triangle, and identifies triangles and other geometric objects drawn on a blackboard, the QA application 112 may determine that geometry is the current subject (or concept). Doing so may allow the governance application 113 to impose the appropriate restrictions on the computing devices 150. The QA application 112 may perform the steps of the method 300 continuously, or according to a predefined timing schedule to ensure that the most current context is detected.

Figure 4:
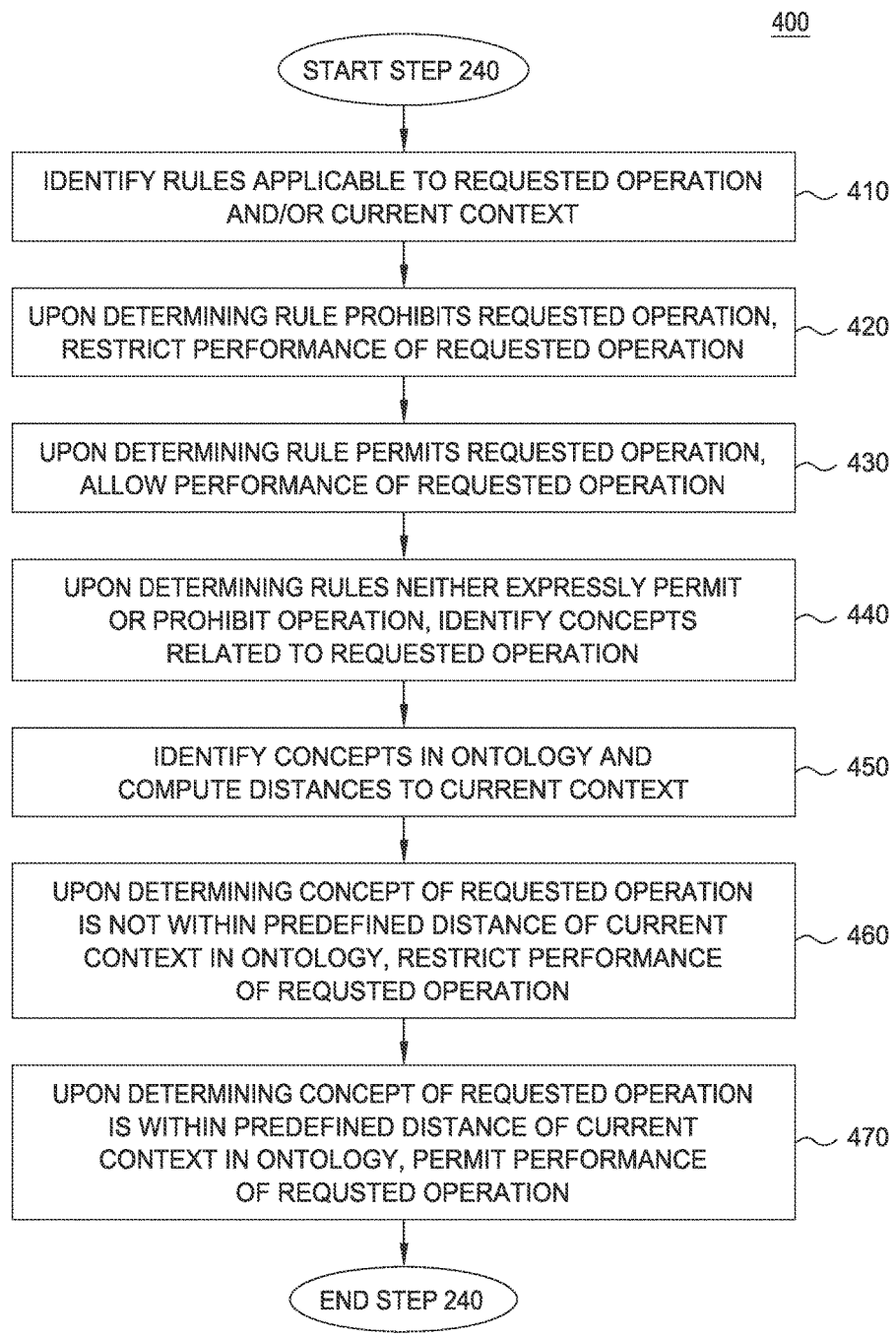

FIG. 4 illustrates a method 400 corresponding to step 240, according to one embodiment. That is, FIG. 4 illustrates a method 400 to determine whether a requested operation is permitted, according to one embodiment. The method 400 begins at step 410, where the governance application 113 and/or the QA application 112 may identify rules in the rules 115 that are applicable to the requested operation and/or the current context. For example, a rule in the rules 115 may specify that no computing functions are permitted during a hand-written exam. As another example, rules in the rules 115 may specify that the requested application is permitted or restricted in the current context. At step 420, the governance application 113 may restrict performance of the requested operation upon determining that a rule prohibits the requested operation. At step 430, the governance application 113 may allow performance of the requested operation upon determining that a rule permits performance of the requested operation.

At step 440, the governance application 113 may determine that the rules in the rules 115 neither expressly prohibit nor permit performance of the requested operation. Therefore, the governance application 113 may invoke the QA application 112 to identify any concepts related to the requested operation. In another embodiment, the governance application 113 may invoke the QA application 112 to perform an analysis to confirm that a requested operation expressly permitted or prohibited by a rule in the rules 115 should be either permitted or prohibited. By identifying concepts associated with the requested operation, the QA application 112 may determine whether the requested operation matches (or is related to) the current context.

The QA application 112 may identify concepts related to the requested operation in any number of ways. For example, the QA application 112 may analyze the text of a document to determine the subject of the document. Similarly, the QA application 112 may perform image analysis of an image to determine concepts in the image. Further still, the QA application 112 may analyze the text of search queries to identify concepts therein. In addition or alternatively, the QA application 112 may identify metadata associated with the requested operation in the corpus 114. For example, the QA application 112 may identify metadata describing the functionalities of an unknown application, and identify concepts in the metadata.

At step 450, the QA application 112 searches an ontology 116 to determine a distance between the ontology nodes for the current context and the concepts identified at step 430. If the nodes are within a predefined distance (which may be defined in the rules 115), the QA application 112 may determine that the concepts are related. At step 460, the QA application 112 may determine that the concept(s) of the requested operation are not within the predefined distance of the current context in the ontology. As such, the QA application 112 may return an indication to the governance application 113 that the requested operation is not related to the current context. The governance application 113 may then restrict performance of the requested operation. At step 470, the QA application 112 may determine that the concept(s) of the requested operation are within the predefined distance of the current context in the ontology. As such, the QA application 112 may return an indication to the governance application 113 that the requested operation is related to the current context. The governance application 113 may then permit performance of the requested operation.

Generally, the QA application 112 may perform any type of analysis to determine whether concepts are related to the current context. For example, the QA application 112 may determine that a teacher is currently lecturing about genetics. The QA application 112 may compute the inverse document frequency (IDF) of the genetics concept in a document a student is attempting to open. If the QA application 112 identifies a threshold number of instances of genetics-related concepts in the document, the QA application 112 may determine that the document is related to the genetics concept, and return an appropriate indication to the governance application 113, which may then permit the student to open the document.

Further still, as indicated, the QA application 112 may compute a measure of similarity between the requested operation and the current context. The measure of similarity may be computed based on any factor (or factors) described herein, such as the rules, distances between concepts in the ontology, and the like. If the measure of similarity exceeds a predefined threshold, the QA application 112 may determine that the requested operation is related to the current context, and permit execution of the requested operation. Similarly, if the measure of similarity does not exceed the predefined threshold, the QA application 112 may restrict performance of the requested operation.

Advantageously, embodiments disclosed herein provide dynamic governance controls on computing devices based on a current context of the relevant environment. For example, law students participating in a contracts lecture will not be allowed to open a video game emulator to play classic video games. However, embodiments disclosed herein may allow the students to access a renowned contracts treatise. Using the techniques disclosed herein, any computing function or operation may be regulated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the QA application 112 and/or the governance application 113 could execute on a computing system in the cloud and impose governance controls based on real-time contexts. In such a case, the QA application 112 could compute a current context and store the current context at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:

receiving, from a set of input devices, data of an environment surrounding a computing device, wherein the received data comprises a captured image depicting an object in the environment;

determining a current context of a discussion based on the object depicted in the captured image and a timing schedule specifying a list of planned contexts;

receiving a request to perform an operation on the computing device;

determining a context of the requested operation;

determining a measure of relatedness between the current context of the discussion and the context of the requested operation;

determining the measure of relatedness does not exceed a predefined threshold; and restricting execution of the operation.

2. The method of claim 1, wherein the requested operation comprises one of: (i) accessing an application, (ii) accessing a feature of the application, (iii) accessing a network resource, (iv) submitting a search query, (v) accessing a result of the search query, and (vi) opening a document.

3. The method of claim 2, wherein the requested operation comprises submitting a search query, wherein the context of the operation comprises a context of the query, wherein submission of the search query is restricted upon determining the measure of relatedness does not exceed the predefined threshold.

4. The method of claim 2, wherein the requested operation comprises accessing a result of the search query, wherein the context of the operation comprises a context of the result, wherein access to the result is restricted upon determining the measure of relatedness does not match exceed the predefined threshold.

5. The method of claim 1, further comprising:

determining that the current context has changed to an updated context based on updated data received from the input devices;

receiving a second request to perform the operation on the computing device; and upon determining the updated context matches the context of the requested operation, allowing execution of the operation on the computing device responsive to the second request.

6. The method of claim 1, wherein a first input device of the set of input devices comprises a camera, wherein the image is captured by the camera, wherein the object comprises a first text, the method further comprising:

analyzing the captured image to identify the object in the environment; and identifying a first concept associated with the first text by performing natural language processing on the first text, wherein the current context is further determined based on the first concept.

7. The method of claim 6, wherein restricting execution of the requested operation is further based on a set of rules, wherein the environment comprises at least one of: (i) a classroom, (ii) a virtual classroom, and (iii) a testing center, wherein the set of rules specify: (i) a set of restricted operations associated with the current context, and (ii) a set of permitted operations associated with the current context, wherein a second input device of the set of input devices comprises a microphone, wherein the received data further comprises audio data of speech in the environment captured by the microphone, the method further comprising:

converting the audio data of the speech in the environment to a second text; and identifying a second concept in the audio data of speech in the environment by performing natural language processing on the second text, wherein the current context is further determined based on the second concept.

8. The method of claim 1, wherein a first input device of the set of input devices comprises a camera, wherein the received data further comprises a video of the environment captured by the camera, and wherein the current context is further determined based on the video of the environment.

* * * * *